United States Patent [19]

Blizzard

[11] 4,255,316

[45] Mar. 10, 1981

[54] CERAMIFIABLE SILICONE ADHESIVES

[75] Inventor: John D. Blizzard, Bay City, Mich.

[73] Assignee: Dow Corning Corporation, Midland, Mich.

[21] Appl. No.: 33,353

[22] Filed: Apr. 26, 1979

[51] Int. Cl.$^3$ .................. C08L 83/06; C04B 35/14
[52] U.S. Cl. ............... 260/37 SB; 106/73.5; 106/73.4; 525/477
[58] Field of Search ............... 260/37 SB; 525/477; 106/73.5, 73.4

[56] References Cited

U.S. PATENT DOCUMENTS

| | | | |
|---|---|---|---|
| 2,676,182 | 4/1953 | Daudt et al. | 260/448.2 |
| 3,090,691 | 5/1963 | Weyer | 106/73.5 |
| 3,108,985 | 10/1963 | Weyer | 260/37 |
| 3,205,283 | 9/1965 | Modic | 525/477 |
| 3,528,940 | 9/1970 | Modic | 260/37 SB |
| 3,699,073 | 10/1972 | Wada et al. | 260/37 SB |

FOREIGN PATENT DOCUMENTS 1199574 7/1970 United Kingdom ............ 525/477

*Primary Examiner*—Wilbert J. Briggs, Sr.
*Attorney, Agent, or Firm*—George A. Grindahl

[57] ABSTRACT

Ceramifiable silicone adhesives having tack and green strength are provided by mixing a ceramifiable filler with certain silicone pressure-sensitive adhesives. The silicone pressure-sensitive adhesive comprises approximately equal weights, plus or minus five percent, of a polydiorganosiloxane having a viscosity of from 1 to 1000 Pa·s and a xylene-soluble resin copolymer of $R_3SiO_{\frac{1}{2}}$ siloxane units and $SiO_{4/2}$ siloxane units. High loadings (80 weight percent of the ceramifiale adhesive) of ceramifiable filler are attainable without loss of tack and green strength when the polydiorganosiloxane is a mixture of a low-viscosity fluid and a high-viscosity fluid. These ceramifiable silicone adhesives are useful for assembling and adhering a plurality of ceramifiable greenware components to form a ceramifiable composite greenware article.

3 Claims, No Drawings

CERAMIFIABLE SILICONE ADHESIVES

BACKGROUND OF THE INVENTION

This invention relates to silicone adhesive compositions which comprise ceramifiable fillers. In particular, this invention relates to ceramifiable silicone adhesive compositions which are useful for assembling a plurality of greenware components to provide a composite greenware article which can be fired to a unitary ceramic article.

There are two general methods for preparing ceramic articles. In a first method a ceramifiable powder, optionally mixed with a bonding agent, such as water, wax or resins, is molded into a desired shape, called greenware, which is subsequently ceramified by a heating process. By this method only relatively simple greenware is available because of the geometrical limitations that are inherent in the molding process.

In a second method, which provides more complex greenware, a fluid composition comprising a ceramifiable filler is used in an adaptation of the investment, i.e. "lost wax," casting process. In this method a destructible core material, such as wax, paper or soft metal, is shaped and coated with said fluid composition and the coating is subsequently converted to the greenware state. Prior to, or during the ceramification process, the destructible core is destroyed by melting, pyrolysis, vaporization, etc. to leave a shaped article that is not obtainable by simple molding processes.

Silicone ceramics are particularly useful as the fluid, ceramifiable composition in this process for forming complex ceramic articles because of increased strength and resistance to large dimensional changes of the greenware during the firing process. Weyer, U.S. Pat. Nos. 3,090,691 and 3,108,985, has disclosed silicone ceramic compositions and a method for making ceramic articles therefrom. Although these disclosures are very broad, ceramifiable adhesive compositions are not specifically contemplated therein.

Complex greenware, unavailable even from the investment casting process, can be made by a third method comprising assembling and adhering a plurality of greenware components, using a suitable adhesive. A suitable adhesive should have sufficient green strength to maintain a plurality of greenware components in a desired arrangement during assembling and handling of the complex article and also during the ceramification process. A suitable adhesive should also be ceramifiable to a form which will become an acceptable, and preferably, an indistinguishable part of the unitary ceramic article.

To be suitably ceramifiable, an adhesive preferably contains a ceramifiable filler of the same kind and in the same concentration that is present in the greenware components. However, most silicone adhesive compositions lose their adhesive property when mixed with large amounts of powdered filler.

SUMMARY OF THE INVENTION

It is an object of this invention to provide ceramifiable silicone adhesive compositions. It is another object of this invention to provide silicone adhesive compositions which comprise at least fifty percent by weight of a ceramifiable filler. It is a further object of this invention to provide a ceramifiable silicone adhesive which is useful in preparing a unitary cordierite ceramic article.

These and other objects will be obvious upon consideration of the following disclosure and appended claims which relate to a composition consisting essentially of a narrowly defined silicone pressure-sensitive and a volatile-free ceramifiable filler.

DETAILED DESCRIPTION OF THE INVENTION

This invention relates to ceramifiable silicone adhesive compositions which are suitable for adhering a plurality of greenware components together to provide a composite greenware article which can be fired to a unitary ceramic article, said compositions consisting essentially of (I) a silicone pressure-sensitive adhesive consisting essentially of (A) 45 to 55 parts by weight of a polydiorganosiloxane fluid having the average formula $YO(R_2SiO)_nY$ wherein each R denotes, independently, a monovalent hydrocarbon radical having from 1 to 6 inclusive carbon atoms, at least 90 percent of all R radicals being methyl radicals, y denotes an endblocking radical and n has an average value so that the polydiorganosiloxane fluid has a viscosity of from 1 to 1000 pascal-seconds at 25° C., and (B) 45 to 55 parts by weight of a xylene-soluble resin copolymer consisting essentially of $R_3SiO_{\frac{1}{2}}$ siloxane units and $SiO_{4/2}$ siloxane units in a mol ratio of from 0.6 to 0.9 $R_3SiO_{\frac{1}{2}}$ units for each $SiO_{4/2}$ unit, wherein each R denotes, independently, a monovalent hydrocarbon radical having from 1 to 6 inclusive carbon atoms, the total of (A) plus (B) being 100 parts by weight, and (II) 20 to 400 parts by weight, for every 100 parts by weight of (A) plus (B), of a volatile-free ceramifiable filler having a softening point above 800° C. and comprising at least one filler selected from the group consisting of ceramic carbides, ceramic nitrides, silicon-free ceramic oxides and ceramic silicates.

Component (I) of the compositions of this invention is a silicone pressure-sensitive adhesive specifically defined to maintain green strength and tack when mixed with large amounts, e.g. more than an equal weight, of ceramic filler. Silicone pressure-sensitive adhesives which are suitable for use as component (I) in this invention consist essentially of 45 to 55 parts by weight of a polydiorganosiloxane fluid (A) and 45 to 55 parts by weight of a xylene-soluble resin copolymer (B), each defined below, the total of (A) plus (B) being 100 parts by weight.

Polydiorganosiloxane fluid (A) has the average formula $YO(R_2SiO)_nY$. Each R denotes, independently, a monovalent hydrocarbon radical having from 1 to 6 carbon atoms, such as methyl, ethyl, propyl, isopropyl, hexyl, cyclohexyl, vinyl, allyl, propenyl and phenyl. At least 90 percent, and preferably 100 percent, of the R radicals are the methyl radical. Thus, $R_2SiO$ siloxane units are preferably $Me_2SiO$ units, although limited amounts of other units, such as MeEtSiO, $Et_2SiO$, MeViSiO, $Vi_2SiO$, MePrSiO, MePhSiO and $Ph_2SiO$ are contemplated. Herein Me, Et, Vi, Pr and Ph denote, respectively, the methyl, ethyl, vinyl, propyl and phenyl radical. Y denotes an oxygen-bonded terminating radical such as H, R or $R_3Si$ wherein R is as noted above. Y is preferably H or R thereby providing a reaction site for curing the fluid, if desired.

Polydiorganosiloxane fluid (A) has a viscosity of from 1 to 1000 pascal-seconds (Pa·s) at 25° C. (1 millipascal-second equals 1 centipoise), which is directly related to the average value of n. For example, in a polydimethylsiloxane fluid having the given formula the average value of n will range from approximately 220 to 1800 in the viscosity range of 1 to 1000 Pa·s at 25° C. Preferably polydiorganosiloxane (A) has a viscosity of less than 100 Pa·s when the amount of ceramifiable filler to be mixed therein exceeds 50 percent by weight, based on the weight of the polydiorganosiloxane (A) plus resin copolymer (B) plus filler (II).

Polydiorganosiloxane (A) is preferably a homogeneous blend of at least one low-molecular weight polydimethylsiloxane fluid having a viscosity of from 1 to 20 Pa·s and at least one high-molecular weight polydimethylsiloxane fluid having a viscosity of greater than 1000 Pa·s, each taken in sufficient quantities so that the viscosity of the mixture has a value of from 1 to 1000 Pa·s, and preferably less than 100 Pa·s at 25° C. Such a mixture of fluids provides a pressure-sensitive adhesive which accepts high loadings of ceramifiable filler, e.g. up to 80 percent by weight of the total of (A) plus (B) plus (II), and yet possessed good green strength and tack.

Polydiorganosiloxane fluids are well known in the organosilicon polymer art and their preparation needs no further comment. Polydiorganosiloxane fluids (A), including mixtures of fluids, are typically characterized by viscosity measurements. Mixtures of fluids which comprise components of widely different molecular weights can be further characterized by gel permeation chromatography in the well-known manner. Gel permeation chromatography is thus useful for characterizing a preferred embodiment of this invention wherein polydiorganosiloxane fluid (A) comprises a mixture of a low-viscosity polydimethylsiloxane fluid and a high-viscosity polydimethylsiloxane fluid.

Resin copolymer (B) is a well-known material in the organosilicon art and a frequently used component of silicone pressure-sensitive adhesives. Said resin copolymer is a solid, xylene-soluble, resinous material which is prepared as, and usually, but not necessarily used as, a solution in an organic solvent. Typical solvents that are used to dissolve resin copolymer (B) include benzene, toluene, xylene, methylene chloride, perchloroethylene and naphtha mineral spirits.

Resin copolymer (B) may be prepared according to Daudt et al., U.S. Pat. No. 2,676,182, whereby a silica hydrosol is treated at low pH with a source of $R_3SiO_{\frac{1}{2}}$ siloxane units, such as hexaorganodisiloxane, such as $Me_3SiOSiMe_3$, $ViMe_2SiOSiMe_2Vi$ or $MeViPhSiOSiPhViMe$ or triorganochlorosilane, such as $Me_3SiCl$, $Me_2ViSiCl$ or $MeViPhSiCl$. Alternatively, a mixture of suitable hydrolyzable, triorganosubstituted-silanes and hydrolyzable silanes free of R radicals may be cohydrolyzed and condensed. In this alternative procedure the resulting condensed copolymer is preferably further treated with a suitable silylating agent, such as hexamethyldisilazane or divinyltetramethyldisilazane, to reduce the hydroxyl content of the copolymer to less than 1 percent by weight.

Resin-copolymer (B) consists essentially of from 0.6 to 0.9 $R_3SiO_{\frac{1}{2}}$ siloxane units for every $SiO_{4/2}$ siloxane unit in the copolymer. Each R denotes, independently, a monovalent hydrocarbon radical having from 1 to 6 inclusive carbon atoms as noted above for component (A). R radicals in component (A) and component (B) may be identical or different.

The mol ratio of $R_3SiO_{\frac{1}{2}}$ and $SiO_{4/2}$ siloxane units can be determined simply from a knowledge of the identity of the R radicals in the $R_3SiO_{\frac{1}{2}}$ siloxane units and the percent carbon analysis of the resin copolymer. In a preferred resin-copolymer consisting of a mol ratio of from 0.6 to 0.9 $Me_3SiO_{\frac{1}{2}}$ siloxane units for every $SiO_{4/2}$ siloxane unit, the carbon analysis has a value of from 19.8 to 24.4 percent by weight.

Pressure-sensitive adhesive (I) is conveniently prepared by simply mixing the appropriate amount of polydiorganosiloxane (A) with an organic-solvent solution of resin-copolymer (B). When polydiorganosiloxane (A) is a mixture of two or more fluids having different viscosities the fluids may be premixed before being mixed with the resin-copolymer (B) or each fluid may be independently admixed with the resin-copolymer solution as desired. Less conveniently, solid resin-copolymer (B) may be mixed with polydiorganosiloxane (A) to prepare the pressure-sensitive adhesive (I). A suitable organic solvent may also be mixed with polydiorganosiloxane (A) before it is mixed with resin-copolymer (B), if desired.

A suitable pressure-sensitive adhesive for use in the compositions of this invention consists essentially of 100 parts by weight of (A) plus (B) with from 45 to 55 parts by weight thereof being the resin copolymer and the balance thereof being the polydiorganosiloxane fluid.

Component (II) of the compositions of this invention is a volatile-free ceramifiable filler having a softening point greater than 800° C. The term "volatile-free" means that the ceramifiable filler is free of water, carbonates and other materials which volatilize below 800° C. In general, volatile-free fillers can be prepared by heating the ceramifiable filler to at least 500° C. to drive-off volatile materials and to decompose carbonates. While the term ceramifiable filler excludes glass, asbestos and mica, it does include silica in its various forms and clays.

Component (II) comprises at least one ceramifiable filler selected from the group of engineering ceramics consisting of ceramic carbides, ceramic nitrides, silicon-free ceramic oxides and ceramic silicates. Encompassed in this group are ceramic nitrides, such as silicon nitride and boron nitride; ceramic carbides, such as silicon carbide, tungsten carbide and molybdenum carbide; ceramic oxides, such as the oxides of aluminum, magnesium, zinc, beryllium, zirconium, titanium and thorium; and ceramic silicates, such as the silicates of aluminum, magnesium, zirconium, titanium and complex silicates, such as magnesium aluminum silicate.

In a preferred embodiment of the present invention the ceramifiable filler (II) consists of a mixture of $SiO_2$, $Al_2O_3$ and MgO powders in amounts of 55.6, 22.2 and 22.2 parts by weight, respectively, for every 100 parts by weight of the filler. Such a mixture is ceramifiable to the useful cordierite ceramic structure and an adhesive of this invention made from such a filler is useful for preparing a unitary cordierite article when used to assemble and adhere greenware components which contain the same powder mixture.

The crystal structure of component (II) is not critical and it may be of synthetic or natural origin. The particle size of component (II) is not critical although finely divided materials are preferred. Preferably the particle size of ceramifiable filler (II) is comparable to the particle size of the ceramifiable filler that is present in the greenware components that are assembled and adhered with the adhesive composition of this invention to form a composite greenware article. This will provide a homogeneous unitary ceramic article after firing of the composite greenware article.

To obtain a unitary ceramic article, free of voids in the areas joined by the adhesive of this invention, it is preferred that the ceramifiable filler (II) have a particle size of less than 10 μm and that it be thoroughly dispersed in the composition, as noted below.

The compositions of this invention consist essentially of from 20 to 400 parts by weight of ceramifiable filler for every 100 parts by weight of polydiorganosiloxane fluid (A) plus resin copolymer (B). Preferably a ceramifiable silicone adhesive of this invention contains at least 100 parts by weight of the ceramifiable filler per 100 parts by weight of (A) plus (B), and most preferably, as much ceramifiable filler as can be included therein without rendering the pressure sensitive adhesive (I) non-tacky. In this way shrinkage of the ceramifiable adhesive during the ceramification process is minimized. This is especially preferred for adhering greenware free of resinous binder.

When used to assemble and adhere greenware components which comprise a resinous binder to provide strength for the greenware components, particularly, greenware components prepared by the method of Weyer, noted above, it is preferred that the ceramifiable silicone adhesive of this invention contain sufficient ceramifiable filler so that its composition matches the composition of the greenware components. For example, when a plurality of greenware components comprising a vulcanized polydimethylsiloxane gum containing 70 percent by weight of a cordierite-forming ceramifiable filler are adhered with a ceramifiable silicone adhesive of this invention, said adhesive preferably contains 70 percent by weight of cordierite-forming ceramifiable filler.

Although not needed, the compositions of this invention may also contain any of the well-known curing agents for polydiorganosiloxane fluid (A), such as dibutyltindiacetate or stannous octoate when (A) bears ≡SiOH endgroups, isopropyltitanate when (A) bears ≡SiOR endgroups and chloroplatinic acid when (A) bears aliphatically unsaturated R radicals and an ≡SiH-bearing component is used as a coreactant in the well-known manner. When this last curing method is used it is preferred that the resin copolymer (B) not contain aliphatically unsaturated R radicals.

The compositions of this invention may contain non-essential components such as thinning agents and pigments as long as they do not adversly effect the adhesiveness and the ceramifiability of the adhesive.

The compositions of this invention may be prepared by simply mixing the silicone pressure-sensitive adhesive (I) and the ceramifiable filler (II) to homogeneously disperse the latter in the former. This may be accomplished by mixing the polydiorganosiloxane (A), resin copolymer (B) and filler (II) in any order. Preferably components (A) and (B) are blended to form the pressure-sensitive adhesive component (I) and the filler (II) thereafter added.

Although any method of mixing is suitable for preparing the compositions of this invention when filler (II) has a large particle size, milling with a three-roll mill is preferred when said particle size is less than 10 μm. Milling of the adhesive is preferred because it breaks up agglomerated filler particles and provides at least two advantages. Milling permits higher loadings of filler in the pressure-sensitive adhesive and it favors the formation of a void-free unitary ceramic article in the areas where the adhesive is used.

The following examples are included in this disclosure to show the best mode currently contemplated for practicing this invention and not to limit the invention. All parts and percentages are by weight unless otherwise stated. All viscosities were measured in centipoise at 25° C. and were converted to pascal-seconds (Pa·s) by multiplying by 0.001 and rounding off.

EXAMPLE 1

Several silicon carbide-containing adhesive compositions (Table I) were prepared by blending various amounts of a resin solution which contained 30 percent xylene and 70 percent resin copolymer having 0.7 $(CH_3)_3SiO_{\frac{1}{2}}$ siloxane units for each $SiO_{4/2}$ siloxane units, a hydroxyl-endblocked polydimethylsiloxane fluid having a viscosity of 12 Pa·s, a hydroxyl-endblocked polydimethylsiloxane fluid having a viscosity of 6 kPa·s and silicon carbide powder having an average particle size of 500 grit. Each composition was then mixed with 0.4 parts of aminopropyltriethoxysilane curing catalyst, coated onto 2 mil dead-soft aluminum, using a reverse roll coater, and heated for one minute at 150° C. to cure the adhesive. Adhesion and tack of the 2-mil thick adhesive were measured according to ASTM D-1000 as follows.

The adhesive-containing aluminum was cut into 1 inch wide strips and the strips were adhered to a stainless steel panel using a 4.5 pound rubber roller. The strips were then pulled from the stainless steel panel at an angle of 180° and at a rate of 12 inches per minute using a Keil tester. The pulling force was measured in ounces per inch and was converted to newtons per meter (N/m) for this disclosure by multiplying by 10.94543 and rounding off. Tack was measured with a Polyken brand probe tack tester. Compositions of this invention (#2, #3 and #4) had desired adhesion and tack.

TABLE I

| | Composition - Parts | | | |
|---|---|---|---|---|
| | 1[(1)] | 2 | 3 | 4 |
| Components | | | | |
| Siloxane Fluid (12 Pa·s) | 65 | 50 | 30 | 30 |
| Siloxane Fluid (6 kPa·s) | 0 | 0 | 20 | 20 |
| Resin Copolymer | 35 | 50 | 50 | 50 |
| Xylene (from resin solution) | 15.3 | 21.4 | 21.4 | 21.4 |
| SiC (%)[(2)] | 24 (19.4) | 24 (19.4) | 24 (19.4) | 40 (28.6) |
| Adhesive Properties | | | | |
| Adhesion (N/m) | 0 | 219 | 350 | 274 |
| Tack | Fair | Excellent | Very Good | Excellent |

[(1)]Not a composition of this invention.
[(2)]Percentage based on xylene-free ceramifiable adhesive composition.

EXAMPLE 2

A silicone pressure-sensitive adhesive solution was prepared by thoroughly mixing 40 parts of a hydroxyl-endblocked polydimethylsiloxane fluid having a viscosity of 12 Pa·s, 10 parts of a hydroxyl-endblocked polydimethylsiloxane fluid having a viscosity of 6 kPa·s and 70 parts of a resin solution consisting of 29 percent xylene and 71 percent of a resin copolymer containing 0.7 $(CH_3)_3SiO_{\frac{1}{2}}$ siloxane units for every $SiO_{4/2}$ siloxane unit. The pressure-sensitive adhesive solution contained 17 percent solvent and had a viscosity of 8.9 Pa·s.

Several adhesive compositions of this invention (#5 through #9, Table II) were prepared by hand-mixing 40, 80, 120, 200 and 400 parts, respectively, of a powder mixture of 5 parts silica, 2 parts alumina and 2 parts magnesia with five 120 part portions of the above-prepared pressure-sensitive adhesive solution. Compositions #8 and #9 were thereafter three-roll milled to provide a better dispersion of the powder in the adhesive.

Each of the resulting ceramifiable adhesive compositions were applied in 0.5 to 1.0 mil thick layers to one side of several 1.5"×1.5"×0.075" pieces of greenware consisting of cured silicon rubber filled with 80 percent by weight of the $SiO_2/Al_2O_3/MgO$ powder mixture, using a gravure hand-proofer. The pieces were heated at 260° C. for 10 minutes to devolatilize the applied adhesive and were then used to assemble five 1.5"×1.5"×0.45" laminate structures by stacking six identical adhesive-bearing greenware squares, adhesive-bearing surface of one square being placed in contact with the adhesive-free surface of an adjacent square, and compressing the stack lightly to form greenware laminate blocks which could be conveniently handled without delaminating.

The greenware laminate blocks were thereafter fired to form unitary ceramic blocks and the cooled blocks were sectioned perpendicularly to the original lamina. The ceramic blocks that had been assembled using adhesive #5 displayed some undesirable quartz formation where the adhesive had been placed while the ceramic block that was assembled using adhesive #7 was free of visible quartz formation. Adhesive #6 produced an intermediate result. These three ceramic articles displayed some void formation in the adhesive zone. The ceramic blocks that were assembled using adhesives #8 and #9 were free of visible quartz formation and were also free of voids in the adhesive zone.

posite greenware article which can be fired to a unitary ceramic article, said composition consisting essentially of (I) a silicone pressure-sensitive adhesive consisting essentially of
  (A) 45 to 55 parts by weight of a polydiorganosiloxane fluid having the average formula $YO(R_2SiO)_nY$ wherein each R denotes, independently, a monovalent hydrocarbon radical having from 1 to 6 inclusive carbon atoms, at least 90 percent of all R radicals being methyl radicals, Y denotes an endblocking radical and n has an average value so that the polydiorganosiloxane fluid has a viscosity of from 1 to 1000 pascal-seconds at 25° C., and
  (B) 45 to 55 parts by weight of a xylene-soluble resin copolymer consisting essentially of $R_3SiO_{1/2}$ siloxane units and $SiO_{4/2}$ siloxane units in a mol ratio of from 0.6 to 0.9 $R_3SiO_{1/2}$ units for each $SiO_{4/2}$ unit, wherein each R denotes, independently, a monovalent hydrocarbon radical having from 1 to 6 inclusive carbon atoms, the total of (A) plus (B) being 100 parts by weight, and
(II) 100 to 400 parts by weight, for every 100 parts by weight of (A) plus (B), of a volatile-free ceramifiable filler having a softening point above 800° C. and consisting of a mixture of 55.6 percent by weight $SiO_2$, 22.2 percent by weight $Al_2O_3$ and 22.2 percent by weight MgO.

2. A composition according to claim 1 wherein the polydiorganosiloxane fluid (A) consists essentially of a mixture of approximately 80 percent by weight of a hydroxyl-endblocked polydimethylsiloxane fluid having a viscosity of from 1 to 20 pascal-seconds at 25° C. and the balance a hydroxyl-endblocked polydimethylsiloxane fluid having a viscosity greater than 1000 pascal-seconds at 25° C.

TABLE II

| | Composition - Parts | | | | |
|---|---|---|---|---|---|
| | 5 | 6 | 7 | 8[1] | 9[1] |
| Components | | | | | |
| Siloxane Fluid (12 Pa · s) | 40 | 40 | 40 | 40 | 40 |
| Siloxane Fluid (6 kPa · s) | 10 | 10 | 10 | 10 | 10 |
| Resin Copolymer | 50 | 50 | 50 | 50 | 50 |
| Xylene (from resin solution) | 20 | 20 | 20 | 20 | 20 |
| $5SiO_2/2Al_2O_3/2MgO$ (%)[2] | 40(28.6) | 80(44.4) | 120(54.5) | 200(66.7) | 400(80) |
| Fired Properties | | | | | |
| Quartz Formation | Some | Slight | None | None | None |
| Void Formation | Some | Some | Some | None | None |

[1]Mixed with a three-roll mill.
[2]Percentage based on xylene-free ceramifiable adhesive composition.

That which is claimed is:

1. A silicone adhesive composition ceramifiable to a quartz-free ceramic and suitable for adhering a plurality of greenware components together to provide a com- 3. A composition according to claims 1 or 2, wherein the polydiorganosiloxane fluid (A) has a viscosity of less than 100 Pa·s at 25° C.

* * * * *